(12) United States Patent
Mohan

(10) Patent No.: US 11,981,491 B2
(45) Date of Patent: May 14, 2024

(54) SYSTEMS, DEVICES, AND METHODS FOR PACKAGING NUTRITIONAL SUPPLEMENTS

(71) Applicant: NuStrips, Inc., Palo Alto, CA (US)

(72) Inventor: Viraj Mohan, San Diego, CA (US)

(73) Assignee: Nustrips, Inc., San Francisco, CA (US)

(*) Notice: Subject to any disclaimer, the term of this patent is extended or adjusted under 35 U.S.C. 154(b) by 456 days.

(21) Appl. No.: 17/174,710

(22) Filed: Feb. 12, 2021

(65) Prior Publication Data

US 2022/0258945 A1    Aug. 18, 2022

(51) Int. Cl.
*B65D 77/06*   (2006.01)
*A23L 33/15*   (2016.01)
(Continued)

(52) U.S. Cl.
CPC ............ *B65D 77/062* (2013.01); *A23L 33/15* (2016.08); *B65D 5/603* (2013.01); *B65D 5/6682* (2013.01); *B65D 65/466* (2013.01); *B65D 75/30* (2013.01); *A23V 2002/00* (2013.01); *B65D 5/56* (2013.01); *B65D 5/66* (2013.01)

(58) Field of Classification Search
CPC .... B65D 77/062; B65D 5/603; B65D 5/6682; B65D 65/466; B65D 75/30; B65D 5/56; B65D 5/66; B65D 33/20; B65D 75/5855; B65D 5/48; A23L 33/15; A23V 2002/00; B32B 2307/31; B31B 50/81
USPC ....... 229/117.28, 120.09, 122; 206/273, 813, 206/473, 800; 426/5
See application file for complete search history.

(56) References Cited

U.S. PATENT DOCUMENTS 2,541,258 A * 2/1951 Lane ................... B65D 85/1063
                                                    206/256
8,763,890 B2 * 7/2014 Clark ........................ C09J 4/06
                                                    206/813
(Continued)

OTHER PUBLICATIONS

Listerine PocketPaks, retrieved from internet at https://www.female.com.au/listerine.htm on Mar. 3, 2023, 4 pages.
(Continued)

*Primary Examiner* — Christopher R Demeree
(74) *Attorney, Agent, or Firm* — Cooley LLP

(57) ABSTRACT

Embodiments described herein relate to systems, devices, and methods for packaging nutritional supplements. In one aspect, an apparatus can include a housing with a cover. The housing can define a chamber and the cover can move between an open configuration and a closed configuration. A plurality of pouches can be disposed in the chamber, and each pouch from the plurality of pouches can contain a strip having a nutrient disposed therein. In some embodiments, each pouch can contain a single strip. In some embodiments, the housing can be composed of a biodegradable material. In some embodiments, the housing can be composed of paper, cardboard, biodegradable plastic, KAPA® board, polyurethane, poster board, or any combination thereof. In some embodiments, each of the plurality of individual pouches can be composed of polyethylene, polypropylene, polyethylene terephthalate, acrylonitrile-butadiene-styrene, polyvinyl chloride, polyamide, polycarbonate, polyoxymethylene, polyurethane, or any combination thereof.

21 Claims, 7 Drawing Sheets

(51) Int. Cl.
*B65D 5/56* (2006.01)
*B65D 5/60* (2006.01)
*B65D 5/66* (2006.01)
*B65D 65/46* (2006.01)
*B65D 75/30* (2006.01)

(56) References Cited

U.S. PATENT DOCUMENTS

| | | |
|---|---|---|
| 8,944,247 B2 | 2/2015 | Hackbarth |
| 9,630,761 B2 * | 4/2017 | Willey .............. B65D 75/5833 |
| 9,688,442 B2 * | 6/2017 | Lyzenga ................ B65B 51/30 |
| 10,093,470 B2 * | 10/2018 | Veternik ............ B65D 75/5844 |
| 10,118,741 B2 * | 11/2018 | Lyzenga ............ B65D 43/0235 |
| 2007/0170196 A1 * | 7/2007 | Libohova ........... B65D 75/5805 |
| | | 221/30 |
| 2014/0202913 A1 | 7/2014 | Wittrock |

OTHER PUBLICATIONS

Kaa timex Ir chemical and packaging projects, "High Barrier Peel-Open Pouch Laminates", archived snapshot captured on Apr. 14, 2018 retrieved at https://web.archive.org/web/20180424221013/https:/kaatimex.bg/en/product-details/high-barrier-peel-open-pouch-laminates/ , 4 pages.

* cited by examiner

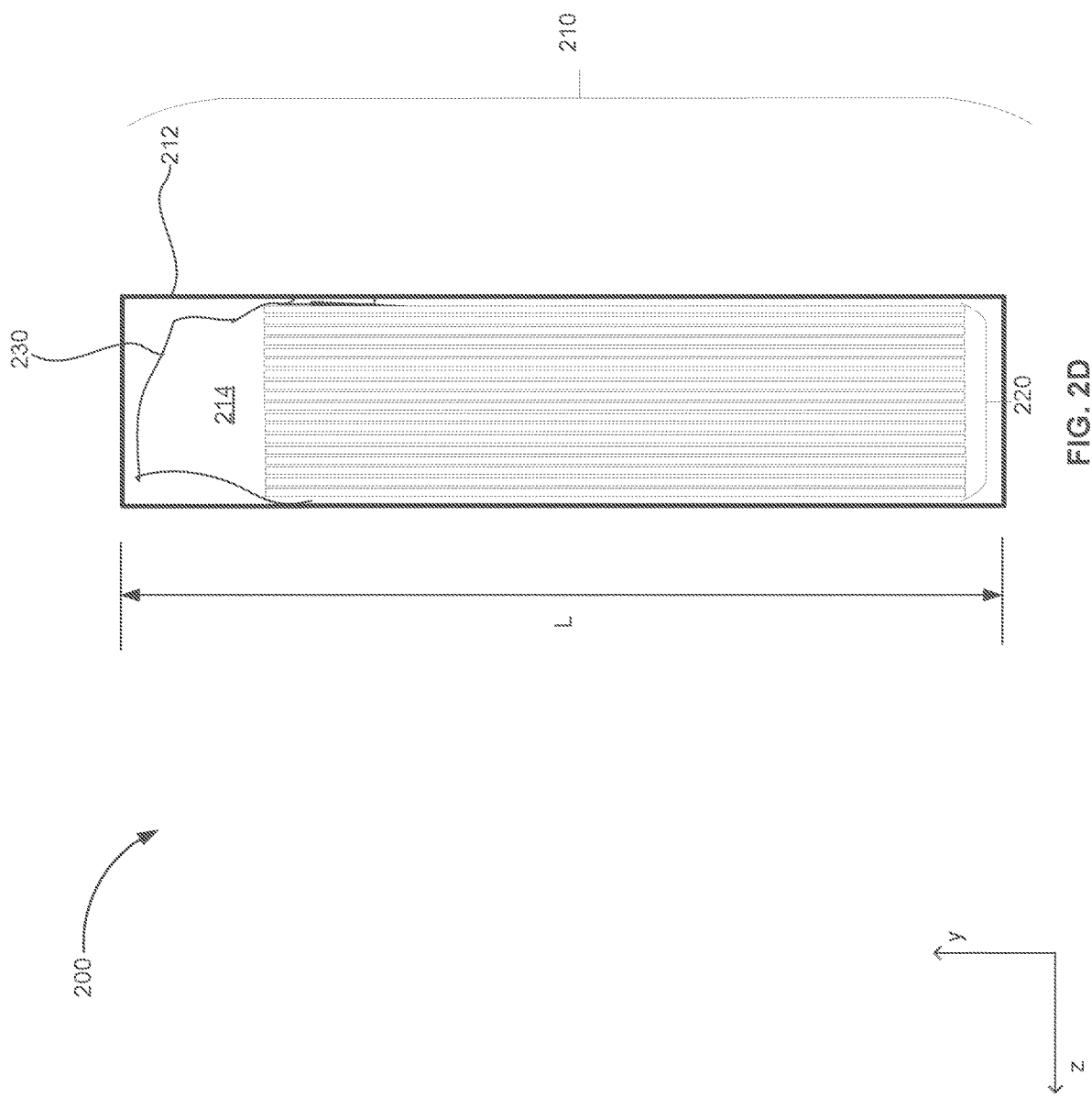

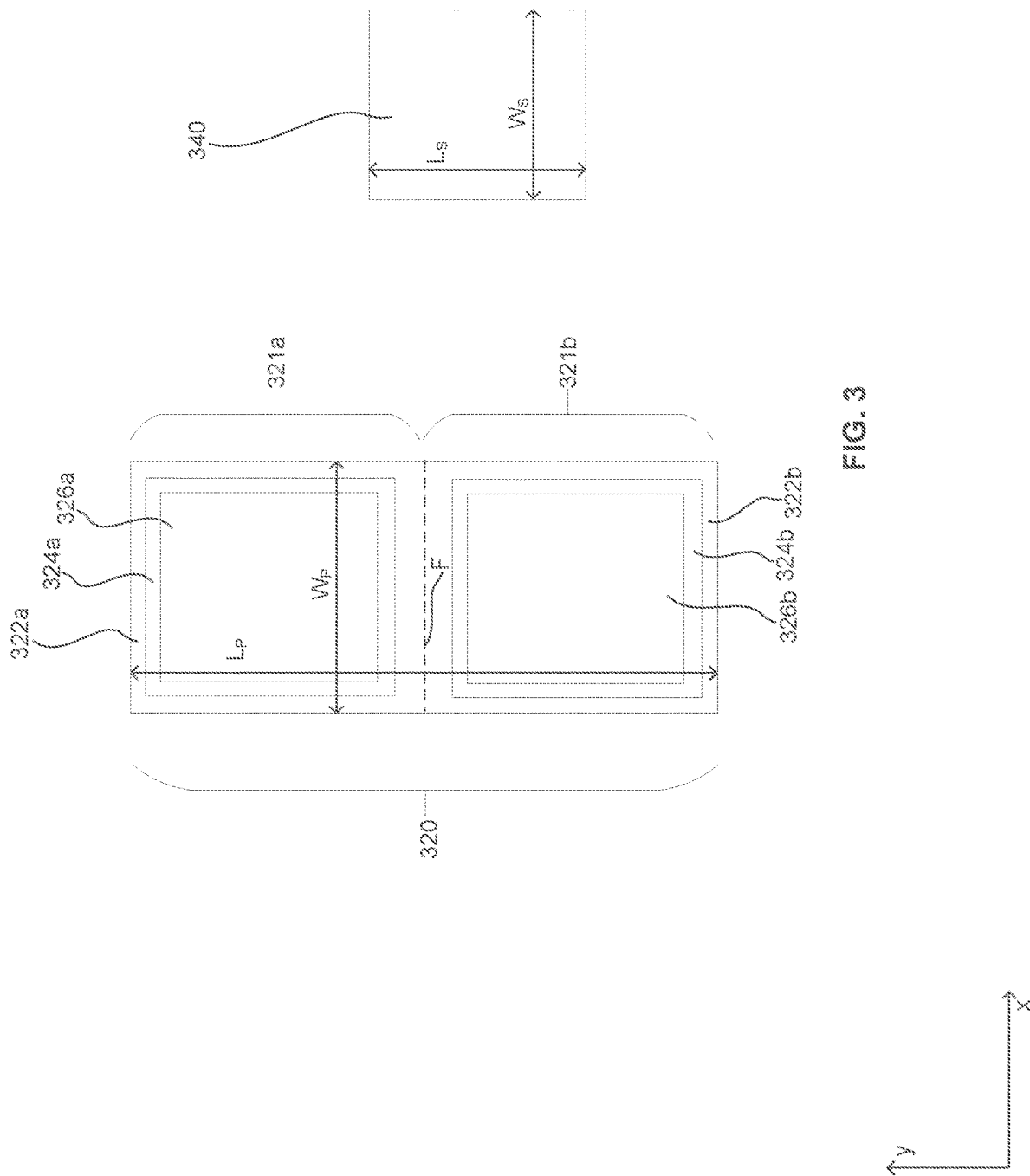

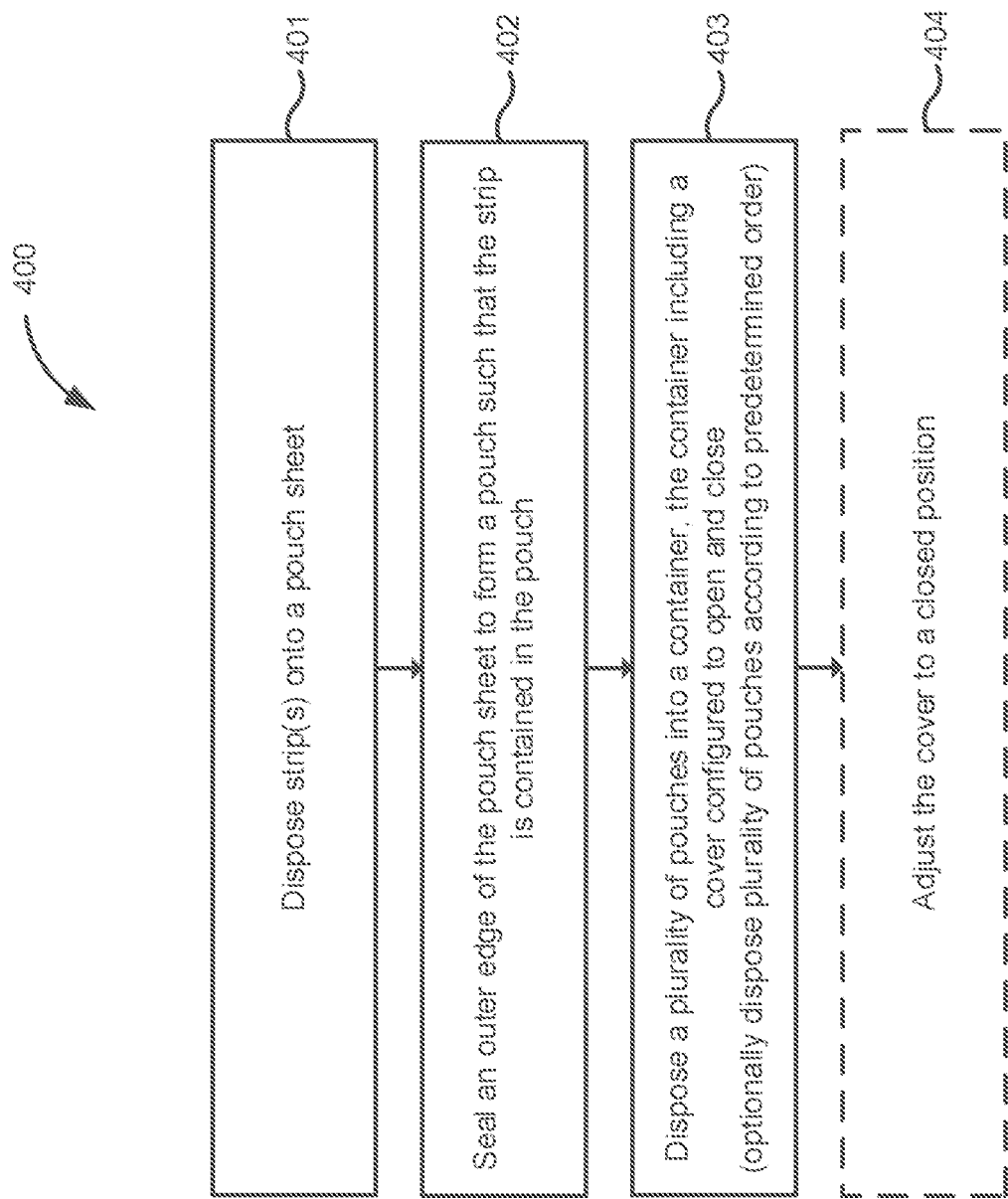

SYSTEMS, DEVICES, AND METHODS FOR PACKAGING NUTRITIONAL SUPPLEMENTS

BACKGROUND

Embodiments described herein relate to systems, devices, and methods for packaging nutritional supplements. Breath strips currently available include multiple strips in a single cartridge or container. Such a design can lead to multiple problems, including a tendency for the strips to stick together in high temperature and/or high humidity environments. Strips can also become contaminated from continued touching of the strips while retrieving a strip. In other words, reaching into a cartridge to retrieve a strip can involve touching the other strips and possibly contaminating them.

SUMMARY

Embodiments described herein relate to systems, devices, and methods for packaging nutritional supplements. In one aspect, an apparatus can include a housing with a cover. The housing can define a chamber and the cover can move between an open configuration and a closed configuration. A plurality of pouches can be disposed in the chamber, and each pouch from the plurality of pouches can contain a strip having a nutrient disposed therein.

In some embodiments, each pouch can contain a single strip.

In some embodiments, the housing can be composed of a biodegradable material.

In some embodiments, the housing can be composed of paper, cardboard, biodegradable plastic, KAPA® board, polyurethane, poster board, or any combination thereof.

In some embodiments, each of the plurality of individual pouches can be composed of polyethylene, polypropylene, polyethylene terephthalate, acrylonitrile-butadiene-styrene, polyvinyl chloride, polyamide, polycarbonate, polyoxymethylene, polyurethane, or any combination thereof.

In some embodiments, each of the plurality of pouches can include a first portion disposed on a first side of the strip and a second portion disposed on a second side of the strip. In some embodiments, the first portion and the second portion can each include outer edges extending beyond outer edges of the strip. In some embodiments, the outer edge of the first portion can be sealed to the outer edge of the second portion along a sealing region, such that the first portion can be peeled away from the second portion, exposing the strip. In some embodiments, each of the plurality of pouches can include an unsealed region between the outer edges of the strip and the inner edges of the sealing region. In some embodiments, the strip can have a length between about 30 mm and about 24 mm and a width between about 25 mm and about 30 mm. In some embodiments, each of the first portion and the second portion can have a length between about 40 mm and about 50 mm and a width between about 35 mm and about 45 mm. In some embodiments, the sealing region can have a width of about 3 mm and the unsealed region can have a width of about 3 mm. In some embodiments, each of the plurality of pouches can be folded along a fold line demarking a boundary between the first portion and the second portion.

In some embodiments, the housing can have a length between about 50 mm and about 60 mm, a width between about 40 mm and about 50 mm, and a depth between about 15 mm and about 20 mm. In some embodiments, the cover has a front side that can be separated from a front side of the housing when opening the cover. The cover can also have a back side that remains fixed to a back side of the housing when opening the cover. In some embodiments, the front side of the cover can have a length between about 15 mm and about 25 mm. In some embodiments, the back side of the cover can have a length between about 5 mm and about 15 mm.

In some embodiments, a lining material can be disposed in the housing. In some embodiments, the lining material can include paper on a first side and aluminum on a second side, the second side opposite the first side.

In some embodiments, the housing can include a box with a rectangular profile.

In some embodiments, each pouch can contain multiple strips. In some embodiments, each strip can contain a recommended daily intake of a nutrient. In some embodiments, each pouch can contain one or more of: an energy strip, a sleep strip, a beauty strip, an immunity strip, or a vitamin strip.

BRIEF DESCRIPTION OF THE DRAWINGS

FIGS. 2A-2D are illustrations of an apparatus for packaging a nutritional supplement, according to an embodiment.

FIG. 3 is an illustration of a pouch and a strip for containing a nutritional supplement, according to an embodiment.

FIG. 4 is a schematic diagram of a method of packaging a nutritional supplement, according to an embodiment.

DETAILED DESCRIPTION

Embodiments described herein relate to systems, devices, and methods for packaging nutritional supplements. In some embodiments, nutritional supplements can be delivered in the form of water-soluble or partially water-soluble strips that dissolve upon contact with a user's mouth. For example, a polysaccharide (such as pullulan) can provide a structural base for the strip, and one or more nutrients can be dispersed or suspended therein. In some embodiments, each strip can be contained in a separate pouch, and the pouches can be disposed in a container. Keeping strips in separate pouches can prevent strips from sticking together and can prevent contamination by continued use. In other words, a user can reach into the container and retrieve a strip without making physical contact with any strips. In some embodiments, multiple strips can be disposed in a single pouch.

In some embodiments, a single pouch can contain a combination of strips customized to the user's daily needs. For example, a single pouch can have a first strip with a recommended daily intake of *ginseng*, a second strip with a recommended daily intake of *Ginkgo biloba*, and a third strip with a recommended daily intake of ascorbic acid. In some embodiments, a single strip can provide multiple nutrients. For example, a single strip can provide the user's recommended daily intake of *ginseng, Ginkgo biloba*, and ascorbic acid.

In some embodiments, a plurality of pouches containing one or more strips can be disposed in a container. The container can include a cover that can open and close for ease of access. The cover can include a first side that separates from the rest of the container and a second side that remains attached to the rest of the container about a hinge that can be adjusted to an open position and a closed position. A lining material can also be disposed in the container and external to the pouches to protect the container from damages and prevent the pouches from sliding out of the container.

Figure 1:
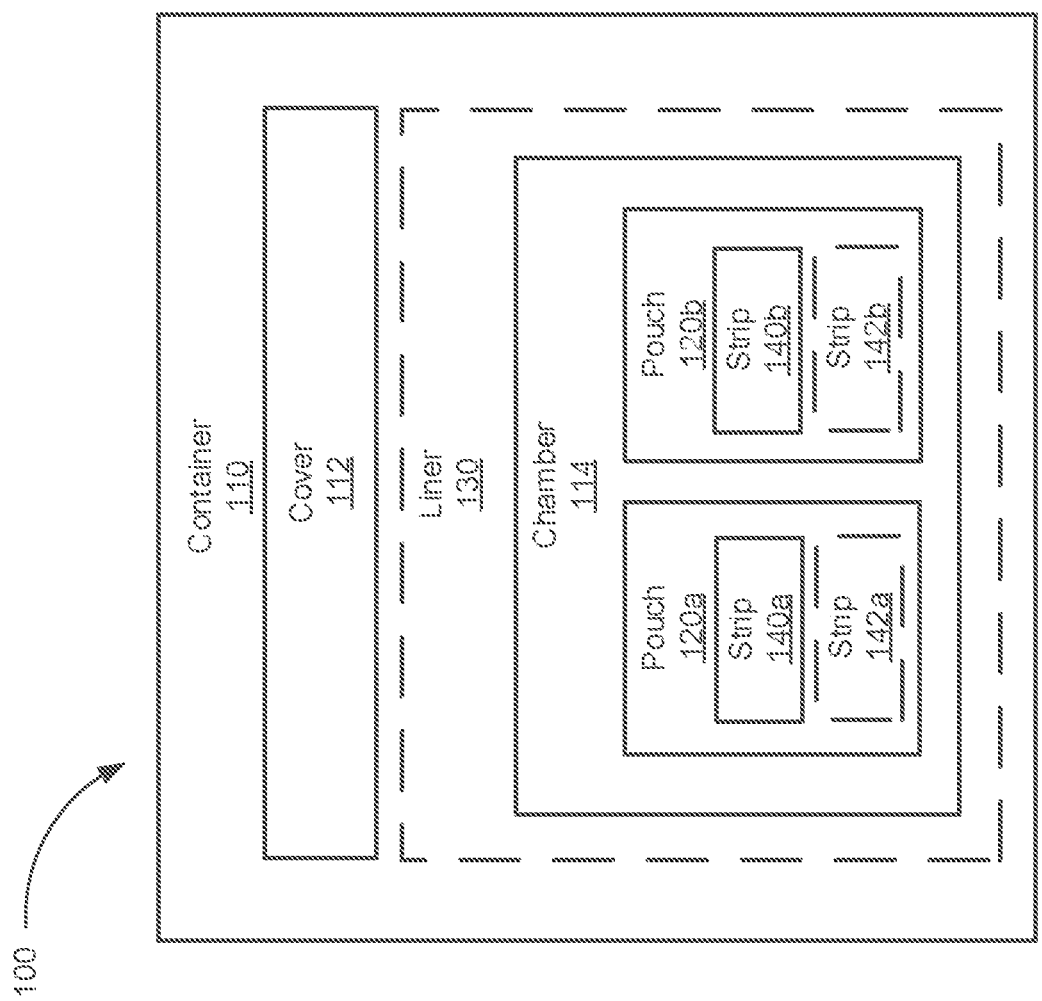
FIG. 1 is a schematic diagram of an apparatus for packaging a nutritional supplement, according to an embodiment.

FIG. 1 is a block diagram of a packaging apparatus 100, according to an embodiment. As shown, the packaging apparatus 100 includes a container 110 with a cover 112 that houses a chamber 114. Disposed inside the chamber 114 is a pouch 120a and a pouch 120b (collectively referred to as pouches 120). The pouch 120a contains a first strip 140a and optionally a second strip 142a. The pouch 120b contains a first strip 140b and optionally a second strip 142b (first strip 140a, second strip 142a, first strip 140b, and second strip 142b collectively referred to herein as either a single strip 140 or strips 140). The packaging apparatus 100 optionally includes a liner 130 disposed in the chamber 114 and external to the pouches 120.

In some embodiments, the container 110 can be composed of a biodegradable material, paper, cardboard, biodegradable plastic, KAPA® board, polyurethane, poster board, rigid board, FSC certified rigid board, 350 GSM solid bleached sulfate (SBS) board, FSC certified 350 GSM SBS board, or any combination thereof. In some embodiments, the container 110 can include writing thereon. In some embodiments, the writing can include pantone color inks. In some embodiments, the writing can include soy inks. In some embodiments, the container can be finished with a zero plastic matt. In some embodiments, the container 110 can be a box with a rectangular profile. In some embodiments, the container 110 can have a rectangular prism shape, a cubic shape, a cylindrical shape, or any other suitable shape. In some embodiments, the container 110 can have a material thickness of at least about 0.1 mm, at least about 0.2 mm, at least about 0.3 mm, at least about 0.4 mm, at least about 0.5 mm, at least about 0.6 mm, at least about 0.7 mm, at least about 0.8 mm, at least about 0.9 mm, at least about 1 mm, at least about 2 mm, at least about 3 mm, or at least about 4 mm. In some embodiments, the container 110 can have a material thickness of no more than about 5 mm, no more than about 4 mm, no more than about 3 mm, no more than about 2 mm, no more than about 1 mm, no more than about 0.9 mm, no more than about 0.8 mm, no more than about 0.7 mm, no more than about 0.6 mm, no more than about 0.5 mm, no more than about 0.4 mm, no more than about 0.3 mm, or no more than about 0.2 mm. Combinations of the above-referenced material thicknesses of the container 110 are also possible (e.g., at least about 0.1 mm and no more than about 5 mm or at least about 0.5 mm and no more than about 2 mm), inclusive of all values and ranges therebetween. In some embodiments, the container 110 can have a material thickness of about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 2 mm, about 3 mm, about 4 mm, or about 5 mm.

As shown, the cover 112 is a portion of the container 110. The cover 112 defines the chamber 114, or the interior space of the container 110. In some embodiments, the cover 112 can be adjustable to both an open and a closed position. In other words, the container 110 can be adjustable to be opened and closed. In some embodiments, the cover 112 can rotate about a hinging axis (not shown) to toggle the cover 112 between an open position and a closed position.

As shown, each of the pouches 120 contain one or more strips 140. In some embodiments, each of the pouches 120 can contain a single strip 140. In other embodiments, each of the pouches 120 can contain about 2, about 3, about 4, about 5, about 6, about 7, about 8, about 9, about 10, or more strips 140. For example, in some embodiments, each pouch 120 can contain more than one type of strip 140, such as, for example, a vitamin strip and an energy strip. In some embodiments, one or more of the pouches 120 can include a first section disposed on a first side of the strip 140 and a second section disposed on a second side of the strip 140, the second side opposite the first side. In some embodiments, the first section can include an outer edge and the second section can include an outer edge, and the outer edge of the first section is sealed to the outer edge of the second section. In some embodiments, sealing the outer edge of the first section to the outer edge of the second section can create a sealed region around an outside perimeter of the pouch 120. In some embodiments, the outer edge of the first section can be sealed to the outer edge of the second section via heat sealing. In some embodiments, the first section and the second section can both include an unsealed region. In some embodiments, the strip 140 can be disposed in the unsealed region. In some embodiments, the strip 140 can be disposed in a portion of the unsealed region, leaving a gap between an outer edge of the strip 140 and the sealed region. In some embodiments, the pouches 120 can be composed of polyethylene, polypropylene, polyethylene terephthalate, acrylonitrile-butadiene-styrene, polyvinyl chloride, polyamide, polycarbonate, polyoxymethylene, polyurethane, or any combination thereof. In some embodiments, the pouches 120 can form a fluid seal to protect the strip(s) 140 contained therein.

As shown, the container 110 contains two pouches 120 disposed therein. In some embodiments, the container 110 can contain enough pouches to provide a monthly supply of strips 140 to a user, e.g., about 25-35 pouches, or any subranges or values in between. In some embodiments, the container 110 can contain at least about 1, at least about 2, at least about 3, at least about 4, at least about 5, at least about 6, at least about 7, at least about 8, at least about 9, at least about 10, at least about 20, at least about 30, at least about 40, at least about 50, at least about 60, at least about 70, at least about 80, at least about 90, or at least about 100 pouches 120. In some embodiments, the container 110 can contain no more than about 100, no more than about 90, no more than about 80, no more than about 70, no more than about 60, no more than about 50, no more than about 40, no more than about 30, no more than about 20, no more than about 10, no more than about 9, no more than about 8, no more than about 7, no more than about 6, no more than about 5, no more than about 4, no more than about 3, or no more than about 2 pouches 120. Combinations of the above-referenced number of pouches 120 contained in the container 110 are also possible (e.g., at least about 1 and no more than 100 or at least about 20 and no more than about 40), inclusive of all values and ranges therebetween. In some embodiments, the container 110 can contain about 1, about 2, about 3, about 4, about 5, about 6, about 7, about 8, about 9, about 10, about 20, about 30, about 40, about 50, about 60, about 70, about 80, about 90, about 100, about 200, about 300, about 400, about 500, about 600, about 700, about 800, about 900, or about 1,000 pouches 120. In some embodiments, the pouches 120 can be arranged in the container 110 according to a predetermined order.

In some embodiments, the liner 130 can be a thin, flexible material disposed around the chamber 114. In some embodiments, the liner 130 can aid in preventing material from going into or out of the container 110. For example, the liner 130 can aid in preventing any pouches 120 from falling through the bottom of the container 120 (e.g., between a front panel of a container and a bottom tuck flap and closure panel of the container 120). In some embodiments, the liner 130 can include paper. In some embodiments, the liner 130 can include aluminum. In some embodiments, the liner 130 can be composed of paper on a first side and aluminum on a second side, the second side opposite the first side. In some embodiments, the liner 130 can be bonded to the container 110 via an adhesive. In some embodiments, the liner 130 can form a fluid seal to protect the pouches 120 and/or strips 140 within the chamber 114. The seal formed by the liner 130 can be broken when a user first opens the container 110 or the liner 130 can be made from a material that re-seals each time a user closes and/or opens the container 110. In some embodiments, the liner 130 can provide additional shock absorption to protect pouches 120 and/or strips 140 within the chamber 114.

In some embodiments, the strips 140 can include a nutrient. In some embodiments, the strips 140 can include multiple nutrients. In some embodiments, the strips 140 can include a recommended daily intake of a nutrient or multiple nutrients. In some embodiments, the strips 140 can include an energy strip, a sleep strip, a beauty strip, an immunity strip, a vitamin strip, or any combination thereof. In some embodiments, multiple strips 140 can be placed into the pouch 120 for one day's use. In other words, the strips 140 can be placed into the pouch 120 to serve multiple daily intake needs for the user. For example, each pouch 120 can include a first type of strip (e.g., a vitamin strip) and a second type of strip (e.g., an energy strip), and a user can intake both strips after opening a pouch 120. In some embodiments, a single strip 140 can serve multiple daily intake needs for the user. In some embodiments, the combinations of different nutrients included in the strips 140 and/or combination of types of strips 140 within each pouch 120 can be customizable.

Figure 2A:
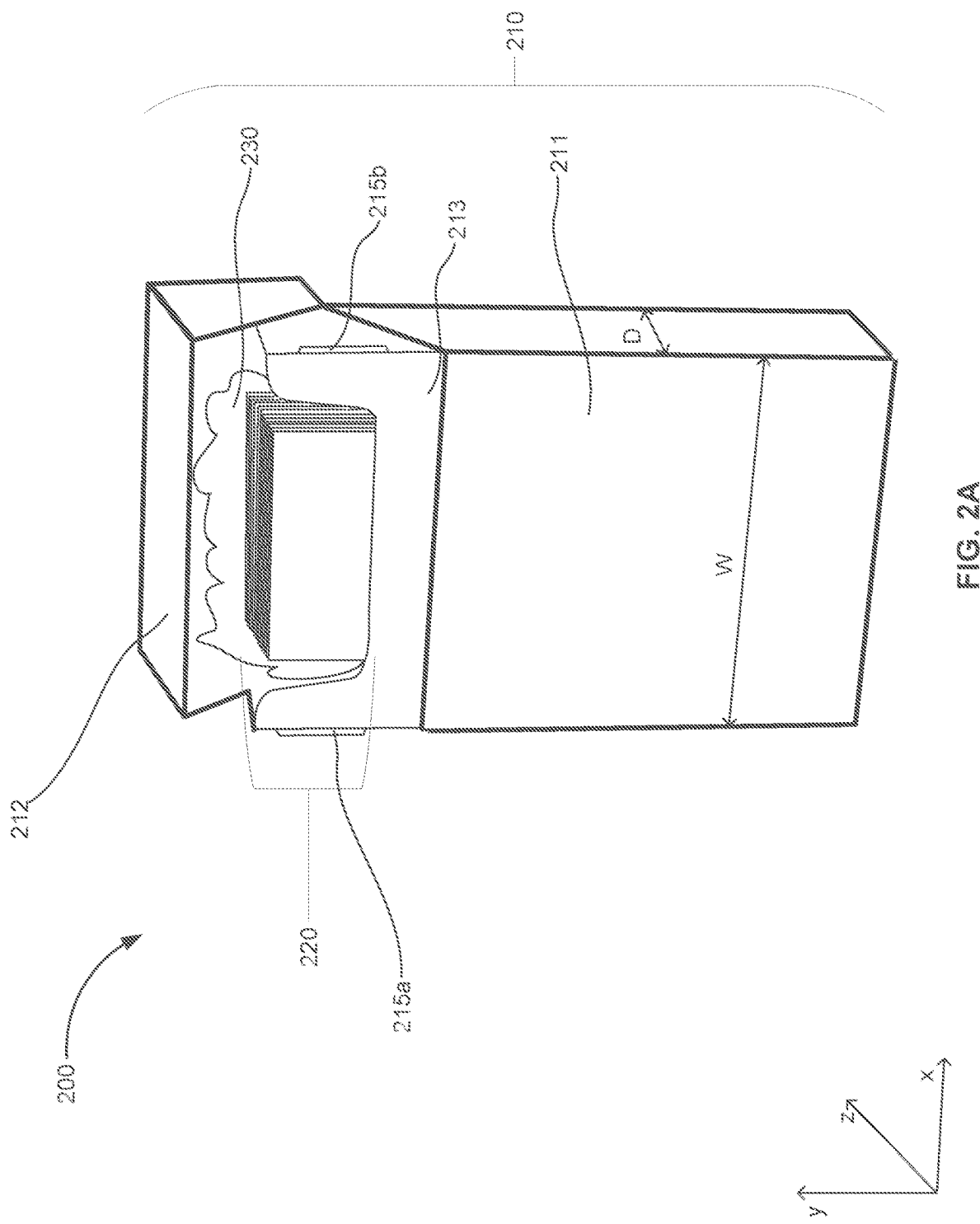
Figure 2B:
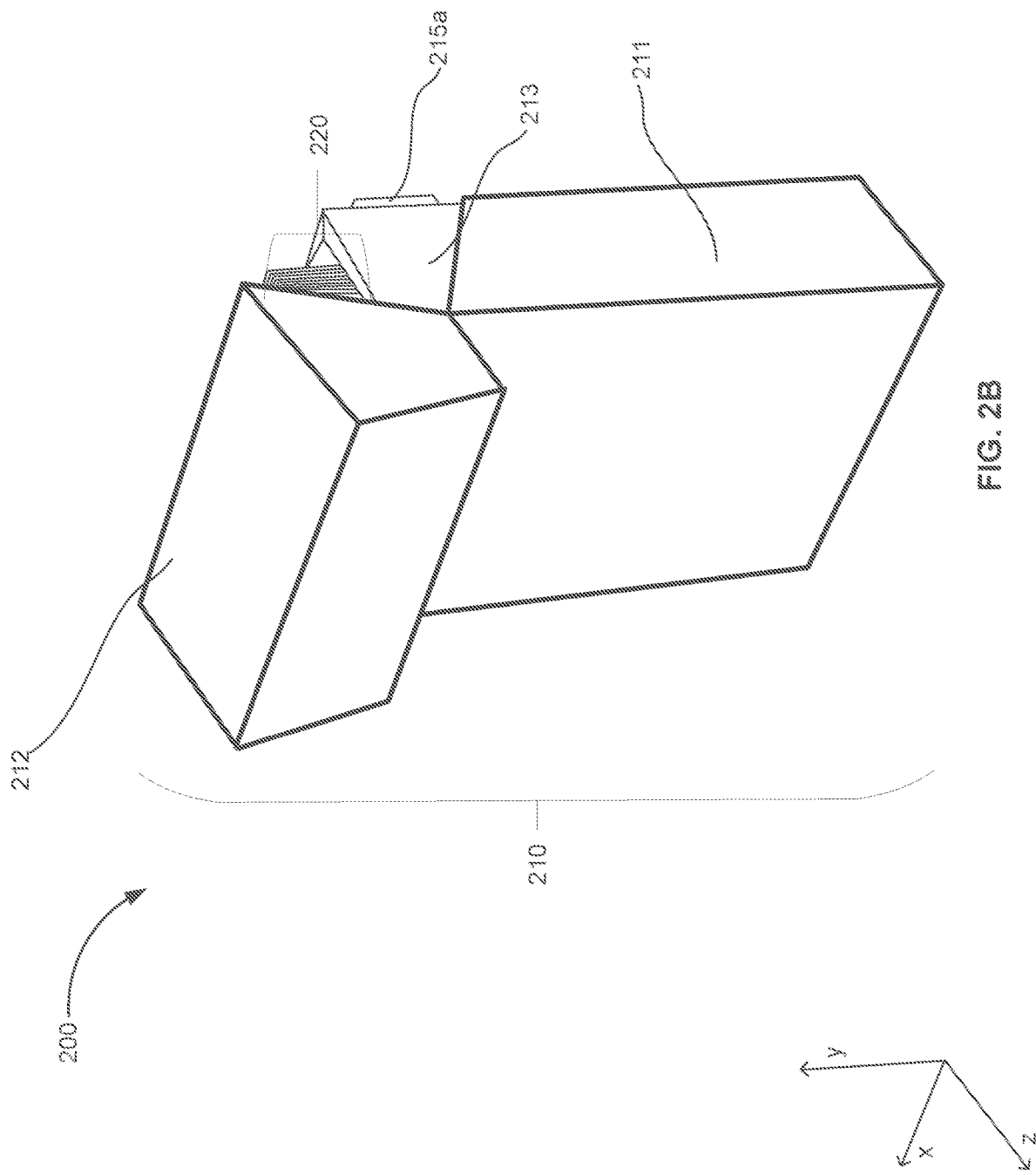
Figure 2C:
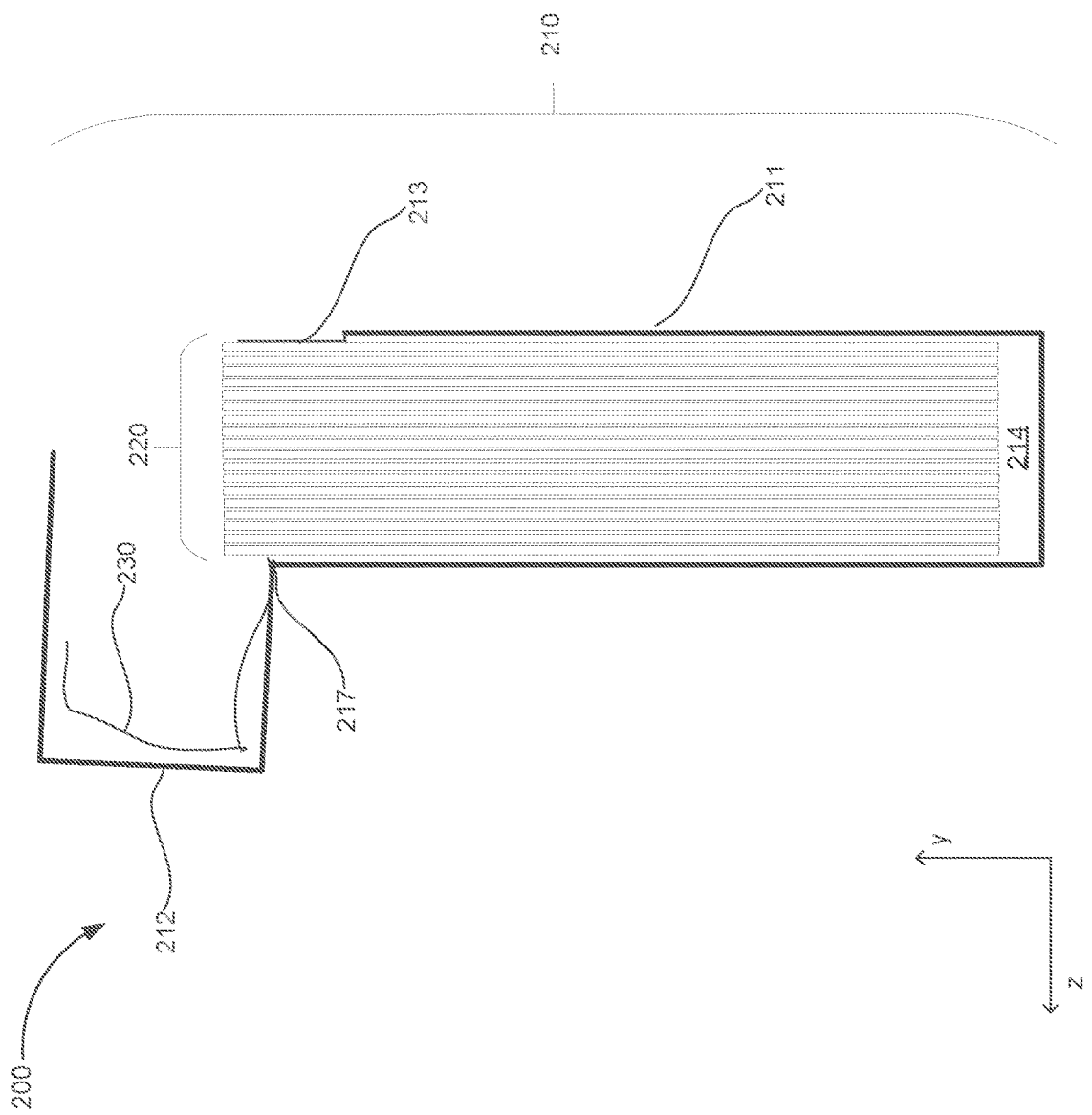

FIGS. 2A-2D illustrate a packaging apparatus 200, according to an embodiment. As shown, the packaging apparatus 200 includes a container 210 with an outer container 211, an inner container 213, a cover 212 and side flaps 215a, 215b (collectively referred to as side flaps 215), a chamber 214, pouches 220, and a liner 230 disposed in the container 210. In some embodiments, the container 210, the cover 212, the chamber 214, the pouches 220, and the liner 230 can be the same or substantially similar to the container 110, the cover 112, the chamber 214 the pouches 120, and the liner 130, as described above with reference to FIG. 1. Thus, certain aspects of the container 210, the cover 212, the chamber 214, the pouches 220, and the liner 230 are not described in greater detail herein. FIG. 2A shows a front perspective view of the packaging apparatus 200. FIG. 2B shows a back perspective view of the packaging apparatus 200. FIG. 2C shows a side cross sectional of the packaging apparatus 200 in an open position while FIG. 2D shows a side cross sectional view of the packaging apparatus 200 in a closed position. Also shown in FIGS. 2A-2D are axes. The x-axis runs width-wise along the container 210, and the container 210 has a width W defined by its size in the x-direction. The y-axis runs length-wise along the container 210, and the container 210 has a length L defined by its size in the y-direction. The z-axis runs depth-wise along the container 210, and the container 210 has a depth D defined by its size in the z-direction.

As shown, the size of the container 210 is indicated by its length L, width W, and depth D. In some embodiments, the container 210 can have a length L of at least about 3 cm, at least about 3.5 cm, at least about 4 cm, at least about 4.5 cm, at least about 5 cm, at least about 5.5 cm, at least about 6 cm, at least about 6.5 cm, at least about 7 cm, at least about 7.5 cm, at least about 8 cm, at least about 8.5 cm, at least about 9 cm, at least about 9.5 cm, at least about 10 cm, at least about 10.5 cm, at least about 11 cm, at least about 11.5 cm, at least about 12 cm, at least about 12.5 cm, at least about 13 cm, at least about 13.5 cm, at least about 14 cm, or at least about 14.5 cm. In some embodiments, the container 210 can have a length L of no more than about 15 cm, no more than about 14.5 cm, no more than about 14 cm, no more than about 13.5 cm, no more than about 13 cm, no more than about 12.5 cm, no more than about 12 cm, no more than about 11.5 cm, no more than about 11 cm, no more than about 10.5 cm, no more than about 10 cm, no more than about 9.5 cm, no more than about 9 cm, no more than about 8.5 cm, no more than about 8 cm, no more than about 7.5 cm, no more than about 7 cm, no more than about 6.5 cm, no more than about 6 cm, no more than about 5.5 cm, no more than about 5 cm, no more than about 4.5 cm, no more than about 4 cm, or no more than about 3.5 cm. Combinations of the above-referenced ranges of the length L are also possible (e.g., at least about 3 cm and no more than about 15 cm or at least about 4 cm and no more than about 12 cm), inclusive of all values and ranges therebetween. In some embodiments, the container 210 can have a length L of about 3 cm, about 3.5 cm, about 4 cm, about 4.5 cm, about 5 cm, about 5.5 cm, about 6 cm, about 6.5 cm, about 7 cm, about 7.5 cm, about 8 cm, about 8.5 cm, about 9 cm, about 9.5 cm, about 10 cm, about 10.5 cm, about 11 cm, about 11.5 cm, about 12 cm, about 12.5 cm, about 13 cm, about 13.5 cm, about 14 cm, about 14.5 cm, or about 15 cm.

In some embodiments, the container 210 can have a width W of at least about 2 cm, at least about 2.5 cm, at least about 3 cm, at least about 3.5 cm, at least about 4 cm, at least about 4.25 cm, at least about 4.5 cm, at least about 5 cm, at least about 5.5 cm, at least about 6 cm, at least about 6.5 cm, at least about 7 cm, at least about 7.5 cm, at least about 8 cm, at least about 8.5 cm, or at least about 9 cm, at least about 9.5 cm. In some embodiments, the container 210 can have a width W of no more than about 10 cm, no more than about 9.5 cm, no more than about 9 cm, no more than about 8.5 cm, no more than about 8 cm, no more than about 7.5 cm, no more than about 7 cm, no more than about 6.5 cm, no more than about 6 cm, no more than about 5.5 cm, no more than about 5 cm, no more than about 4.5 cm, no more than about 4.25 cm, no more than about 4 cm, no more than about 3.5 cm, no more than about 3 cm, or no more than about 2.5 cm. Combinations of the above-referenced ranges of the width W of the container 210 are also possible (e.g., at least about 2 cm and no more than about 10 cm or at least about 4 cm and no more than about 6 cm), inclusive of all values and ranges therebetween. In some embodiments, the container 210 can have a width W of about 2 cm, about 2.5 cm, about 3 cm, about 3.5 cm, about 4 cm, about 4.25 cm, about 4.5 cm, about 5 cm, about 5.5 cm, about 6 cm, about 6.5 cm, about 7 cm, about 7.5 cm, about 8 cm, about 8.5 cm, or about 9 cm, about 9.5 cm, or about 10 cm.

In some embodiments, the container 210 can have a depth D of at least about 1 cm, at least about 1.5 cm, at least about 2 cm, at least about 2.5 cm, at least about 3 cm, at least about 3.5 cm, at least about 4 cm, or at least about 4.5 cm. In some embodiments, the container 210 can have a depth D of no more than about 5 cm, no more than about 4.5 cm, no more than about 4 cm, no more than about 3.5 cm, no more than about 3 cm, no more than about 2.5 cm, no more than about 2 cm, or no more than about 1.5 cm. Combinations of the above-referenced ranges of the depth D of the container 210 are also possible (e.g., at least about 1 cm and no more than about 5 cm or at least about 2 cm and no more than about 4 cm), inclusive of all values and ranges therebetween. In some embodiments, the container 210 can have a depth D of about 1 cm, about 1.5 cm, about 2 cm, about 2.5 cm, about 3 cm, about 3.5 cm, about 4 cm, about 4.5 cm, or about 5 cm. In some embodiments, the outer container 211 can have dimensions the same or substantially similar to the dimensions of the container 210.

In some embodiments, the outer container 211 can have a thickness (i.e., a "wall thickness") of at least about 100 µm, at least about 200 µm, at least about 300 µm, at least about 400 µm, at least about 500 µm, at least about 600 µm, at least about 700 µm, at least about 800 µm, at least about 900 µm, at least about 1 mm, at least about 1.5 mm, at least about 2 mm, at least about 2.5 mm, at least about 3 mm, at least about 3.5 mm, at least about 4 mm, or at least about 4.5 mm. In some embodiments, the outer container 211 can have a thickness of no more than about 5 mm, no more than about 4.5 mm, no more than about 4 mm, no more than about 3.5 mm, no more than about 3 mm, no more than about 2.5 mm, no more than about 2 mm, no more than about 1.5 mm, no more than about 1 mm, no more than about 900 µm, no more than about 800 µm, no more than about 700 µm, no more than about 600 µm, no more than about 500 µm, no more than about 400 µm, no more than about 300 µm, or no more than about 200 µm. Combinations of the above-referenced thicknesses of the outer container 211 are also possible (e.g., at least about 100 µm and no more than about 5 mm or at least about 500 µm and no more than about 2 mm), inclusive of all values and ranges therebetween. In some embodiments, the outer container 211 can have a thickness of about 100 µm, about 200 µm, about 300 µm, about 400 µm, about 500 µm, about 600 µm, about 700 µm, about 800 µm, about 900 µm, about 1 mm, about 1.5 mm, about 2 mm, about 2.5 mm, about 3 mm, about 3.5 mm, about 4 mm, about 4.5 mm, or about 5 mm.

In some embodiments, the inner container 213 can have a length of at least about 2 cm, at least about 2.5 cm, at least about 3 cm, at least about 3.5 cm, at least about 4 cm, at least about 4.5 cm, at least about 5 cm, at least about 5.5 cm, at least about 6 cm, at least about 6.5 cm, at least about 7 cm, at least about 7.5 cm, at least about 8 cm, at least about 8.5 cm, at least about 9 cm, at least about 9.5 cm, at least about 10 cm, at least about 10.5 cm, at least about 11 cm, or at least about 11.5 cm. In some embodiments, the inner container 213 can have a length of no more than about 12 cm, no more than about 11.5 cm, no more than about 11 cm, no more than about 10.5 cm, no more than about 10 cm, no more than about 9.5 cm, no more than about 9 cm, no more than about 8.5 cm, no more than about 8 cm, no more than about 7.5 cm, no more than about 7 cm, no more than about 6.5 cm, no more than about 6 cm, no more than about 5.5 cm, no more than about 5 cm, no more than about 4.5 cm, no more than about 4 cm, no more than about 3.5 cm, no more than about 3 cm, or no more than about 2 cm. Combinations of the above-referenced ranges of the length of the inner container 213 are also possible (e.g., at least about 2 cm and no more than about 12 cm or at least about 4 cm and no more than about 8 cm), inclusive of all values and ranges therebetween. In some embodiments, the inner container 213 can have a length of about 2 cm, about 2.5 cm, about 3 cm, about 3.5 cm, about 4 cm, about 4.5 cm, about 5 cm, about 5.5 cm, about 6 cm, about 6.5 cm, about 7 cm, about 7.5 cm, about 8 cm, about 8.5 cm, about 9 cm, about 9.5 cm, about 10 cm, about 10.5 cm, about 11 cm, about 11.5 cm, or about 12 cm.

In some embodiments, the inner container 213 can have a width of at least about 2 cm, at least about 2.5 cm, at least about 3 cm, at least about 3.5 cm, at least about 4 cm, at least about 4.25 cm, at least about 4.5 cm, at least about 5 cm, at least about 5.5 cm, at least about 6 cm, at least about 6.5 cm, at least about 7 cm, or at least about 7.5 cm. In some embodiments, the inner container 213 can have a width of no more than about 8 cm, no more than about 7.5 cm, no more than about 7 cm, no more than about 6.5 cm, no more than about 6 cm, no more than about 5.5 cm, no more than about 5 cm, no more than about 4.5 cm, no more than about 4.25 cm, no more than about 4 cm, no more than about 3.5 cm, no more than about 3 cm, or no more than about 2.5 cm. Combinations of the above-referenced ranges of the width of the inner container 213 are also possible (e.g., at least about 2 cm and no more than about 8 cm or at least about 4 cm and no more than about 6 cm), inclusive of all values and ranges therebetween. In some embodiments, the inner container 213 can have a width of about 2 cm, about 2.5 cm, about 3 cm, about 3.5 cm, about 4 cm, about 4.25 cm, about 4.5 cm, about 5 cm, about 5.5 cm, about 6 cm, about 6.5 cm, about 7 cm, about 7.5 cm, or about 8 cm.

In some embodiments, the inner container 213 can have a depth of at least about 1 cm, at least about 1.5 cm, at least about 2 cm, at least about 2.5 cm, at least about 3 cm, at least about 3.5 cm, at least about 4 cm, or at least about 4.5 cm. In some embodiments, the inner container 213 can have a depth of no more than about 5 cm, no more than about 4.5 cm, no more than about 4 cm, no more than about 3.5 cm, no more than about 3 cm, no more than about 2.5 cm, no more than about 2 cm, or no more than about 1.5 cm. Combinations of the above-referenced ranges of the depth of the inner container 213 are also possible (e.g., at least about 1 cm and no more than about 5 cm or at least about 2 cm and no more than about 4 cm), inclusive of all values and ranges therebetween. In some embodiments, the inner container 213 can have a depth of about 1 cm, about 1.5 cm, about 2 cm, about 2.5 cm, about 3 cm, about 3.5 cm, about 4 cm, about 4.5 cm, or about 5 cm.

In some embodiments, the inner container 213 can have a thickness (i.e., a "wall thickness") of at least about 100 µm, at least about 200 µm, at least about 300 µm, at least about 400 µm, at least about 500 µm, at least about 600 µm, at least about 700 µm, at least about 800 µm, at least about 900 µm, at least about 1 mm, at least about 1.5 mm, at least about 2 mm, at least about 2.5 mm, at least about 3 mm, at least about 3.5 mm, at least about 4 mm, or at least about 4.5 mm. In some embodiments, the inner container 213 can have a thickness of no more than about 5 mm, no more than about 4.5 mm, no more than about 4 mm, no more than about 3.5 mm, no more than about 3 mm, no more than about 2.5 mm, no more than about 2 mm, no more than about 1.5 mm, no more than about 1 mm, no more than about 900 µm, no more than about 800 µm, no more than about 700 µm, no more than about 600 µm, no more than about 500 µm, no more than about 400 µm, no more than about 300 µm, or no more than about 200 µm. Combinations of the above-referenced thicknesses of the inner container 213 are also possible (e.g., at least about 100 µm and no more than about 5 mm or at least about 500 µm and no more than about 2 mm), inclusive of all values and ranges therebetween. In some embodiments, the inner container 213 can have a thickness of about 100 µm, about 200 µm, about 300 µm, about 400 µm, about 500 µm, about 600 µm, about 700 µm, about 800 µm, about 900 µm, about 1 mm, about 1.5 mm, about 2 mm, about 2.5 mm, about 3 mm, about 3.5 mm, about 4 mm, about 4.5 mm, or about 5 mm.

In some embodiments, the outer container 211 and/or the inner container 213 can be composed of a biodegradable material, paper, cardboard, biodegradable plastic, KAPA® board, polyurethane, poster board, rigid board, FSC certified rigid board, 350 GSM solid bleached sulfate (SBS) board, FSC certified 350 GSM SBS board, or any combination thereof. In some embodiments, the outer container 213 can include writing thereon. In some embodiments, the writing can include pantone color inks. In some embodiments, the writing can include soy inks. In some embodiments, the container can be finished with a zero plastic matt.

As shown, the cover 212 moves about a hinging axis 217 to toggle between an open position and a closed position. The chamber 214 is an interior region inside the container 210. In some embodiments, the pouches 220 can be contained in the chamber 214. The side flaps 215 can aid in holding the cover 212 in place while the cover 212 is in the closed position. In some embodiments, the side flaps 215 can be foldable and/or flexible. In some embodiments, the side flaps 215 can be composed of the same material as the rest of the container 210. In some embodiments, the side flaps 215 can be composed of a different material from the rest of the container 210. In some embodiments, the container 210 can include a lock or securement mechanism to hold the container 210 in the closed position.

As shown, the pouches 220 are arranged front to back. In other words, the pouches 220 are arranged along different portions of the z-axis. In some embodiments, the pouches 220 can be arranged side to side (i.e., along the x-axis). In some embodiments, the pouches 220 can be arranged top to bottom (i.e., along the y-axis).

In some embodiments, the liner 230 can cover a large portion of an interior surface of the outer container 211. In some embodiments, the liner 230 can cover at least about 50%, at least about 60%, at least about 70%, at least about 80%, at least about 90%, or at least about 95% of the interior surface of the container 210. In some embodiments, the liner 230 can protect the interior surface of the container 210 from markings made by the pouches 220.

FIG. 3 is an illustration of a pouch 320 and a strip 340, according to an embodiment. In some embodiments, the pouch 320 and the strip 340 can be the same or substantially similar to the pouch 120 and the strip 140, as described above with reference to FIG. 1. Thus, certain aspects of the pouch 320 and the strip 340 are not described in greater detail herein. Also shown in FIG. 3 are axes. As shown, the pouch 320 has a length $L_P$ defined by its size along the y-axis and a width $W_P$ defined by its size along the x-axis. As shown, the strip 340 has a length Ls defined by its size along the y-axis and a width $W_S$ defined by its size along the x-axis.

As shown, the pouch 320 has a first section 321a and a second section 321b (collectively referred to as the sections 321). As shown, the pouch 320 folds along fold line F to couple the first section 321a to the second section 321b. In some embodiments, the first section 321a can be a separate piece of material from the second section 321b. As shown, the first section 321a includes a sealing region 322a, an unsealed region 324a, and a strip region 326a. As shown, the second section 321b includes a sealing region 322b, an unsealed region 324b, and a strip region 326b. In some embodiments, the first section 321a and/or the second section 321b can include a tab (not shown) for ease of separating the first section 321a from the second section 321b.

In some embodiments, the pouch 320 can have a length $L_P$ of at least about 4 cm, at least about 4.5 cm, at least about 5 cm, at least about 5.5 cm, at least about 6 cm, at least about 6.5 cm, at least about 7 cm, at least about 7.5 cm, at least about 8 cm, at least about 8.5 cm, at least about 9 cm, at least about 9.5 cm, at least about 10 cm, at least about 10.5 cm, at least about 11 cm, at least about 11.5 cm, at least about 12 cm, or at least about 12.5 cm. In some embodiments, the pouch 320 can have a length $L_P$ of no more than about 13 cm, no more than about 12.5 cm, no more than about 12 cm, no more than about 11.5 cm, no more than about 11 cm, no more than about 10.5 cm, no more than about 10 cm, no more than about 9.5 cm, no more than about 9 cm, no more than about 8.5 cm, no more than about 8 cm, no more than about 7.5 cm, no more than about 7 cm, no more than about 6.5 cm, no more than about 6 cm, no more than about 5.5 cm, no more than about 5 cm, or no more than about 4.5 cm. Combinations of the above-referenced a length $L_P$ values are also possible (e.g. at least about 4 cm and no more than about 13 cm or at least about 6 cm and no more than about 10 cm), inclusive of all values and ranges therebetween. In some embodiments, the pouch 320 can have a length $L_P$ of about 4 cm, about 4.5 cm, about 5 cm, about 5.5 cm, about 6 cm, about 6.5 cm, about 7 cm, about 7.5 cm, about 8 cm, about 8.5 cm, about 9 cm, about 9.5 cm, about 10 cm, about 10.5 cm, about 11 cm, about 11.5 cm, about 12 cm, about 12.5 cm, or about 13 cm.

In some embodiments, the pouch 320 can have a width $W_P$ of at least about 2.5 cm, at least about 3 cm, at least about 3.5 cm, at least about 4 cm, at least about 4.5 cm, at least about 5 cm, at least about 5.5 cm, at least about 6 cm, or at least about 6.5 cm. In some embodiments, the pouch 320 can have a width $W_P$ of no more than about 7 cm, no more than about 6.5 cm, no more than about 6 cm, no more than about 5.5 cm, no more than about 5 cm, no more than about 4.5 cm, no more than about 4 cm, no more than about 3.5 cm, or no more than about 3 cm. Combinations of the above-referenced width $W_P$ values of the pouch 320 are also possible (e.g., at least about 2.5 cm and no more than about 7 cm or at least about 4 cm and no more than about 6 cm), inclusive of all values and ranges therebetween. In some embodiments, the pouch 320 can have a width $W_P$ of about 2.5 cm, about 3 cm, about 3.5 cm, about 4 cm, about 4.5 cm, about 5 cm, about 5.5 cm, about 6 cm, or about 6.5 cm, or about 7 cm.

In some embodiments, the first section 321a and/or the second section 321b can have a length (i.e., a size along the y-axis) of at least about 2.5 cm, at least about 3 cm, at least about 3.5 cm, at least about 4 cm, at least about 4.5 cm, at least about 5 cm, at least about 5.5 cm, at least about 6 cm, or at least about 6.5 cm. In some embodiments, the first section 321a and/or the second section 321b can have a length of no more than about 7 cm, no more than about 6.5 cm, no more than about 6 cm, no more than about 5.5 cm, no more than about 5 cm, no more than about 4.5 cm, no more than about 4 cm, no more than about 3.5 cm, or no more than about 3 cm. Combinations of the above-referenced length values of the first section 321a and/or the second section 321b are also possible (e.g., at least about 2.5 cm and no more than about 7 cm or at least about 4 cm and no more than about 6 cm), inclusive of all values and ranges therebetween. In some embodiments, the first section 321a and/or the second section 321b can have a length of about 2.5 cm, about 3 cm, about 3.5 cm, about 4 cm, about 4.5 cm, about 5 cm, about 5.5 cm, about 6 cm, or about 6.5 cm, or about 7 cm.

In some embodiments, the first section 321a and/or the second section 321b can have a width (i.e., a size along the x-axis) of at least about 2.5 cm, at least about 3 cm, at least about 3.5 cm, at least about 4 cm, at least about 4.5 cm, at least about 5 cm, at least about 5.5 cm, at least about 6 cm, or at least about 6.5 cm. In some embodiments, the first section 321a and/or the second section 321b can have a width of no more than about 7 cm, no more than about 6.5 cm, no more than about 6 cm, no more than about 5.5 cm, no more than about 5 cm, no more than about 4.5 cm, no more than about 4 cm, no more than about 3.5 cm, or no more than about 3 cm. Combinations of the above-referenced width values of the first section 321a and/or the second section 321b are also possible (e.g., at least about 2.5 cm and no more than about 7 cm or at least about 4 cm and no more than about 6 cm), inclusive of all values and ranges therebetween. In some embodiments, the first section 321a and/or the second section 321b can have a width of about 2.5 cm, about 3 cm, about 3.5 cm, about 4 cm, about 4.5 cm, about 5 cm, about 5.5 cm, about 6 cm, or about 6.5 cm, or about 7 cm.

In some embodiments, the sealing regions 322a, 322b (collectively referred to as the sealing regions 322) can be sealed together via heat sealing. In some embodiments, the sealing regions 322 can be sealed together via an adhesive. In some embodiments, the sealing region 322a can be peeled away from the sealing region 322b and/or the sealing region 322b can be peeled away from the sealing region 322a. In some embodiments, the sealing regions 322 can have a width around the outside of the sections 321 of at least about 2 mm, at least about 2.5 mm, at least about 3 mm, at least about 3.5 mm, at least about 4 mm, or at least about 4.5 mm. In some embodiments, the sealing regions 322 can have a width around the outside of the sections 321 of no more than about 5 mm, no more than about 4.5 mm, no more than about 4 mm, no more than about 3.5 mm, no more than about 3 mm, or no more than about 2.5 mm. combinations of the above-referenced widths of the sealing regions 322 are also possible (e.g., at least about 2 mm and no more than about 5 mm or at least about 3 mm and no more than about 4 mm), inclusive of all values and ranges therebetween. In some embodiments, the sealing regions 322 can have a width around the outside of the sections 321 of about 2 mm, about 2.5 mm, about 3 mm, about 3.5 mm, about 4 mm, about 4.5 mm, or about 5 mm. In some embodiments, the sealing regions 322 can have a first width along the x-axis and a second width along the y-axis. In some embodiments, the second width can be different from the first width. In some embodiments, the second width can be the same or substantially similar to the first width.

The unsealed region 324a and the unsealed region 324b (collectively referred to as the unsealed regions 324) provide a buffer region between the region where the strip 340 is disposed (i.e., the strip region 326a and the strip region 326b, collectively referred to as the strip regions 326). In some embodiments, the unsealed regions 324 can have a width of at least about 2 mm, at least about 2.5 mm, at least about 3 mm, at least about 3.5 mm, at least about 4 mm, or at least about 4.5 mm. In some embodiments, the unsealed regions 324 can have a width of no more than about 5 mm, no more than about 4.5 mm, no more than about 4 mm, no more than about 3.5 mm, no more than about 3 mm, or no more than about 2.5 mm. combinations of the above-referenced widths of the sealing regions 322 are also possible (e.g., at least about 2 mm and no more than about 5 mm or at least about 3 mm and no more than about 4 mm), inclusive of all values and ranges therebetween. In some embodiments, the unsealed regions 324 can have a width of about 2 mm, about 2.5 mm, about 3 mm, about 3.5 mm, about 4 mm, about 4.5 mm, or about 5 mm. In some embodiments, the unsealed regions 324 can have a first width along the x-axis and a second width along the y-axis. In some embodiments, the second width can be different from the first width. In some embodiments, the second width can be the same or substantially similar to the first width.

The strip regions 326 are portions of the sections 321 that bond and/or couple to the strip 340. In some embodiments, the strip regions 326 can have a length (i.e., a dimension in the y-axis) of at least about 2 cm, at least about 2.5 cm, at least about 3 cm, at least about 3.1 cm, at least about 3.2 cm, at least about 3.3 cm, at least about 3.4 cm, at least about 3.5 cm, at least about 4 cm, at least about 4.5 cm, at least about 5 cm, or at least about 5.5 cm. In some embodiments, the strip regions 326 can have a length of no more than about 6 cm, no more than about 5.5 cm, no more than about 5 cm, no more than about 4.5 cm, no more than about 4 cm, no more than about 3.5 cm, no more than about 3.4 cm, no more than about 3.3 cm, no more than about 3.2 cm, no more than about 3.1 cm, no more than about 3 cm, or no more than about 2.5 cm. Combinations of the above-referenced lengths of the strip regions 326 are also possible (e.g., at least about 2 cm and no more than about 6 cm or at least about 3 cm and no more than about 3.5 cm), inclusive of all values and ranges therebetween. In some embodiments, the strip regions 326 can have a length of about 2 cm, about 2.5 cm, about 3 cm, about 3.1 cm, about 3.2 cm, about 3.3 cm, about 3.4 cm, about 3.5 cm, about 4 cm, about 4.5 cm, about 5 cm, about 5.5 cm, or about 6 cm.

In some embodiments, the strip regions 326 can have a width (i.e., a dimension in the x-axis) of at least about 1.5 cm, at least about 2 cm, at least about 2.5 cm, at least about 2.6 cm, at least about 2.7 cm, at least about 2.8 cm, at least about 2.9 cm, at least about 3 cm, at least about 3.5 cm, at least about 4 cm, at least about 4.5 cm, or at least about 5 cm. In some embodiments, the strip regions 326 can have a width of no more than about 5.5 cm, no more than about 5 cm, no more than about 4.5 cm, no more than about 4 cm, no more than about 3.5 cm, no more than about 3 cm, no more than about 2.9 cm, no more than about 2.8 cm, no more than about 2.7 cm, no more than about 2.6 cm, no more than about 2.5 cm, or no more than about 2 cm. Combinations of the above-referenced widths of the strip regions 326 are also possible (e.g., at least about 1.5 cm and no more than about 5.5 cm or at least about 2.5 cm and no more than about 3 cm), inclusive of all values and ranges therebetween. In some embodiments, the strip regions 326 can have a width of about 1.5 cm, about 2 cm, about 2.5 cm, about 2.6 cm, about 2.7 cm, about 2.8 cm, about 2.9 cm, about 3 cm, about 3.5 cm, about 4 cm, about 4.5 cm, about 5 cm, or about 5.5 cm. In some embodiments, the width of the strip regions 326 can be the same or substantially similar to the length of the strip regions 326. In some embodiments, the width of the strip regions 326 can be different from the length of the strip regions 326.

In some embodiments, the strip 340 can have a length Ls of at least about 2 cm, at least about 2.5 cm, at least about 3 cm, at least about 3.1 cm, at least about 3.2 cm, at least about 3.3 cm, at least about 3.4 cm, at least about 3.5 cm, at least about 4 cm, at least about 4.5 cm, at least about 5 cm, or at least about 5.5 cm. In some embodiments, the strip 340 can have a length Ls of no more than about 6 cm, no more than about 5.5 cm, no more than about 5 cm, no more than about 4.5 cm, no more than about 4 cm, no more than about 3.5 cm, no more than about 3.4 cm, no more than about 3.3 cm, no more than about 3.2 cm, no more than about 3.1 cm, no more than about 3 cm, or no more than about 2.5 cm. Combinations of the above-referenced lengths Ls of the strip 340 are also possible (e.g., at least about 2 cm and no more than about 6 cm or at least about 3 cm and no more than about 3.5 cm), inclusive of all values and ranges therebetween. In some embodiments, the strips 340 can have a length Ls of about 2 cm, about 2.5 cm, about 3 cm, about 3.1 cm, about 3.2 cm, about 3.3 cm, about 3.4 cm, about 3.5 cm, about 4 cm, about 4.5 cm, about 5 cm, about 5.5 cm, or about 6 cm.

In some embodiments, the strip 340 can have a width $W_S$ of at least about 1.5 cm, at least about 2 cm, at least about 2.5 cm, at least about 2.6 cm, at least about 2.7 cm, at least about 2.8 cm, at least about 2.9 cm, at least about 3 cm, at least about 3.5 cm, at least about 4 cm, at least about 4.5 cm, or at least about 5 cm. In some embodiments, the strip 340 can have a width $W_S$ of no more than about 5.5 cm, no more than about 5 cm, no more than about 4.5 cm, no more than about 4 cm, no more than about 3.5 cm, no more than about 3 cm, no more than about 2.9 cm, no more than about 2.8 cm, no more than about 2.7 cm, no more than about 2.6 cm, no more than about 2.5 cm, or no more than about 2 cm. Combinations of the above-referenced widths $W_S$ of the strip 340 are also possible (e.g., at least about 1.5 cm and no more than about 5.5 cm or at least about 2.5 cm and no more than about 3 cm), inclusive of all values and ranges therebetween. In some embodiments, the strip 340 can have a width $W_S$ of about 1.5 cm, about 2 cm, about 2.5 cm, about 2.6 cm, about 2.7 cm, about 2.8 cm, about 2.9 cm, about 3 cm, about 3.5 cm, about 4 cm, about 4.5 cm, about 5 cm, or about 5.5 cm. In some embodiments, the width $W_S$ of the strip 340 can be the same or substantially similar to the length Ls of the strip 340. In some embodiments, the width $W_S$ of the strip 340 can be different from the length Ls of the strip 340.

FIG. 4 is a schematic diagram of a method 400 of packaging a nutritional supplement, according to an embodiment. As shown, the method 400 includes disposing one or more strips onto a pouch sheet at 401, sealing an outer edge of the pouch sheet to form a pouch such that the strip is contained in the pouch, and disposing a plurality of pouches into a container at 403. The container can include a cover that opens and closes. In some embodiments, the pouches can be disposed according to a predetermined order. The method 400 optionally includes adjusting the cover to a closed position at 404.

In some embodiments, 401 can include disposing a single strip onto the pouch sheet. In some embodiments, 401 can include disposing multiple strips onto the pouch sheet. In some embodiments, the multiple strips can be disposed onto the pouch according to a predetermined order.

402 includes sealing the outer edge of the pouch sheet to form a pouch containing the strip. In some embodiments, 402 can include sealing a first section of a pouch to a second section of the pouch to enclose the strip in the pouch. In some embodiments, the second section can be part of the same piece of material as the first section. In some embodiments, the second section can be a separate piece of material from the first section. In some embodiments, 402 can include heat sealing. In some embodiments, 402 can include sealing with an adhesive. In some embodiments, the sealing at 402 can include leaving a tab on the first section and/or the second section for ease of peeling the first section apart from the second section.

In some embodiments, 403 can include disposing the pouches into the container in a predetermined order, according to the needs of the user. In some embodiments, 404 can include adjusting the container to the closed position for safekeeping. In some embodiments, 404 can include activating a tab or locking mechanism to prevent the container from opening spontaneously.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a plurality of pouches, the plurality of pouches can be considered as multiple, distinct pouches or as one pouch with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. An apparatus, comprising:
   a housing including a cover, the housing defining a chamber, the cover configured to move between an open configuration and a closed configuration; and
   a plurality of pouches disposable in the chamber, each pouch from the plurality of pouches configured to contain a strip having a nutrient disposed therein,
   each of the plurality of pouches including a first portion configured to be disposed on a first side of the strip and a second portion configured to be disposed on a second side of the strip, the first portion and the second portion each including multiple outer edges configured to extend beyond outer edges of the strip,
   each of the outer edges of the first portion configured to be sealed to the each of the outer edges of the second portion along a sealing region, such that the first portion can be peeled away from the second portion to expose the strip.

2. The apparatus of claim 1, wherein each pouch from the plurality of pouches contains a single strip.

3. The apparatus of claim 1, wherein the housing is composed of a biodegradable material.

4. The apparatus of claim 1, wherein the housing is composed of paper, cardboard, biodegradable plastic, KAPA® board, polyurethane, poster board, or any combination thereof.

5. The apparatus of claim 1, wherein each of the plurality of individual pouches is composed of polyethylene, polypropylene, polyethylene terephthalate, acrylonitrile-butadiene-styrene, polyvinyl chloride, polyamide, polycarbonate, polyoxymethylene, polyurethane, or any combination thereof.

6. The apparatus of claim 1, further comprising an unsealed region between the outer edges of the strip and inner edges of the sealing region.

7. The apparatus of claim 6, wherein the strip has a length of between about 30 mm and about 35 mm and a width of between about 25 mm and about 30 mm.

8. The apparatus of claim 6, wherein each of the first portion and the second portion has a length of between about 40 mm and about 50 mm and a width of between about 35 mm and about 45 mm.

9. The apparatus of claim 6, wherein the sealing region has a width of about 3 mm and the unsealed region has a width of about 3 mm.

10. The apparatus of claim 1, wherein each of the plurality of pouches is folded along a fold line demarking a boundary between the first portion and the second portion.

11. The apparatus of claim 1, wherein the housing has a length between about 50 mm and about 60 mm, a width between about 40 mm and about 50 mm, and a depth between about 15 mm and about 20 mm.

12. The apparatus of claim 11, wherein the cover has a front side configured to be separated from a front side of the housing when opening the cover and a back side configured to remain fixed to a back side of the housing when opening the cover, the front side of the cover having a length of between about 15 mm and about 25 mm, the back side of the cover having a length between about 5 mm and about 15 mm.

13. The apparatus of claim 1, further comprising a lining material disposed in the housing.

14. The apparatus of claim 13, wherein the lining material includes paper on a first side and aluminum on a second side, the second side opposite the first side.

15. The apparatus of claim 1, wherein the housing is a box with a rectangular profile.

16. An apparatus, comprising:
a housing including a cover, the housing defining a chamber, the cover configured to move between an open configuration and a closed configuration; and
a plurality of pouches disposable in the chamber, each pouch from the plurality of pouches configured to contain multiple strips having a nutrient disposed therein, each pouch from the plurality of pouches including a first portion and a second portion, the first portion and the second portion each including multiple outer edges, the outer edges of the first portion configured to be sealed to the outer edges of the second portion.

17. The apparatus of claim 16, further comprising the strips, wherein each strip contains a recommended daily intake of a nutrient.

18. The apparatus of claim 16, wherein each pouch contains one or more of: an energy strip, a sleep strip, a beauty strip, an immunity strip, or a vitamin strip.

19. The apparatus of claim 16, wherein the housing is composed of a biodegradable material.

20. The apparatus of claim 16, wherein each of the plurality of pouches includes two portions that are configured to peel apart.

21. An apparatus, comprising:
a housing including a cover, the housing defining a chamber, the cover configured to move between an open configuration and a closed configuration; and
a plurality of pouches disposable in the chamber, each pouch from the plurality of pouches configured to contain a strip having a nutrient disposed therein,
each of the plurality of pouches including a first portion configured to be disposed on a first side of the strip and a second portion configured to be disposed on a second side of the strip, the first portion and the second portion each including outer edges configured to extend beyond outer edges of the strip, the outer edges of the first portion configured to be sealed to the outer edges of the second portion along a sealing region, such that the strip is contained within an inner unsealed region of each pouch,
the inner unsealed region having a size greater than a size of the strip such that a portion of the inner unsealed region extends beyond the outer edges of the strip, the portion of the inner unsealed region extending beyond the outer edges of the strip having a width of at least about 2 mm.

* * * * *